United States Patent [19]

Astley et al.

[11] 4,039,403

[45] Aug. 2, 1977

[54] ELECTROWINNING METALS

[75] Inventors: David John Astley, Selly Oak; John Roger Bawden Gilbert; Ian Robert Scholes, both of Sutton Coldfield; Jan Stephan Jacobi, Wolverhampton; Garth Royston Brookes, Walsall, all of England

[73] Assignees: Imperial Metal Industries (Kynoch) Limited, Birmingham; IMI Refinery Holdings Limited, both of England

[21] Appl. No.: 661,786

[22] Filed: Feb. 26, 1976

[30] Foreign Application Priority Data

Mar. 5, 1975 United Kingdom ............... 9107/75

[51] Int. Cl.² ........................... C25B 1/00; C25C 7/02
[52] U.S. Cl. ............................ 204/105 R; 204/108; 204/112; 204/287; 204/291; 204/294
[58] Field of Search ................ 204/105 R, 287, 291, 204/293–294, 108, 112

[56] References Cited

U.S. PATENT DOCUMENTS

| 3,223,611 | 12/1965 | Wells et al. | 204/287 |
| 3,459,515 | 8/1969 | Bergmann | 204/291 |
| 3,880,728 | 4/1975 | Haberman et al. | 204/290 F |
| 3,943,048 | 3/1976 | Fisher et al. | 204/291 |
| 3,957,600 | 5/1976 | Ives et al. | 204/293 |

Primary Examiner—R. L. Andrews
Attorney, Agent, or Firm—Cushman, Darby & Cushman

[57] ABSTRACT

A method of electrowinning metals in which the anode comprises a foraminate container containing particulate material chosen from the group electrically conducting non-polarizing compound of a metal and a non-metallic element.

18 Claims, 3 Drawing Figures

ELECTROWINNING METALS

BACKGROUND OF THE INVENTION

This invention relates to a method of electrowinning metals and to cells and anodes for use in connection with such a method.

The extraction and recovery of metals from acqueous acidic solutions by electrowinning involves the use of an insoluble anode in an electrolytic cell. The aqueous solution forms the electrolyte, and a suitable cathode, usually in the form of a plate or sheet on which the metal is deposited, forms the remaining part of the cell. Under suitable conditions, metal of very high purity can be deposited, and the process is used for winning metal from solutions derived from metal ores, scrap metal and from metal refining processes. In particular, copper, nickel, cobalt, manganese and zinc are common metals which may be extracted from acid solutions by such a process and such solutions are completely or partly stripped of their metal content without significant replenishment from the anode material. Electrowinning is to be distinguished from electrorefining in which the anode is a soluble anode principally composed of the metal which is to be deposited on the cathode.

Ideally, the anode used in electrowinning should be completely resistant to the electrolytic conditions, should suffer no weight loss, should not form a passive film or give rise to any reaction which would interfere with the cathodic deposition of metal at an economic current density. In practice, these conditions cannot be fulfilled by any economically realistic anode and all of the anodes presently being used have a small amount of dissolution which may affect the purity of the metal deposit. Thus, lead, which is widely used in electrowinning, is not completely resistant to anodic loss and some lead becomes co-deposited with the copper, thereby reducing the purity and hence the commercial value of the copper deposit. Whilst the wear rate of lead may be acceptably low for low current density electrolytic cells, some lead is picked up in the cathode and the wear rate increases in certain commonly found conditions. These are increasing current density, increasing acidity, increasing electrode temperature, and increasing chloride concentration. With the increase in current density, lead tends to oxidise and flake away from the anode and this increases the removal rate to an unacceptable degree. Lead in copper has a deleterious effect on the conductivity of the copper and it also adversely affects the ability to draw the copper to fine wire.

Another form of non-consumable anode is titanium, either commercially pure or alloyed, which is coated with some form of noble metal or noble metal compound. Titanium on its own is unsatisfactory because it rapidly polarises when made anodic. By polarisation is meant the rapid formation of an insulating film, usually an oxide, on the exterior surface of the anode material such that it is unable to pass a current at a voltage which is economically viable in a commercial electrowinning cell. Whilst noble metal coated anodes are technically attractive for electrowinning operations, there is a very small loss of noble metal, which although not significantly affecting the purity of the deposited metal, does adversely affect the economics of the process because of the very high cost of the noble metal wastage and the high capital costs of the electrode.

In the electrorefining of copper, insoluble anodes have been proposed which consist of alloys of copper and silicon with additions of iron, tin, lead and manganese. These alloys, available commercially under the trade name "Chilex", have been used in Chile and are cast into suitable shapes for use in the electrolytic bath. These alloys have been in use for 40-50 years. The wear rate of these alloys is about 10-25mm/year depending on electrolyte conditions and the current density. The wear is principally due to copper passing into solution, which copper is then eventually deposited on the cathode. This dissolution is not in itself objectionable since it does not contaminate the cathode deposit, but it does mean that the anode has to be replaced periodically.

In the electrowinning of cobalt, insoluble anodes of cobalt-silicon have been proposed, these alloys being commercially available under the trade name "Luilu". These "Luilu" alloys are again cast into suitable anode shapes and wear gradually in use. Since they are used in cobalt electrolysis, the cobalt is recovered from the anode and is not lost. Both copper-silicon alloys and cobalt-silicon alloys are relatively brittle and can become damaged during transit and handling which again reduces their effective life and increases their costs.

SUMMARY OF THE INVENTION

By the present invention, there is provided a method of electrowinning a metal from an aqueous solution containing ions of the metal which includes the steps of inserting an anode and a cathode into the solution, connecting the anode positively with respect to the cathode, and passing an electrical current through the anode and cathode, characterised in that the anode is a foraminate container containing particulate material chosen from the group comprising electrically conducting, non-polarising compounds of a metal and a non-metallic element, there being provided means to supply the current to the particulate material.

The non-metallic element may be chosen from the group silicon, oxygen, nitrogen, boron or carbon and the metal may be chosen from the group titanium, vanadium, chromium, manganese, iron, cobalt, nickel, lead and copper. The particulate material may be specifically chosen from the group lead dioxide, manganese dioxide, cobalt oxide, magnetite, copper-silicon alloys and cobalt-silicon alloys.

The foraminate container may be formed of titanium or a titanium alloy and may have a stereo-reticular array of plastics material on the outside thereof. Alternatively, the container may be of a non-conducting material, preferably a plastics material, with a current lead-in in contact with the particulate material. The current lead-in may be a copper-cored titanium bar. The plastics material foraminate container may have a stereo-reticular array of plastics material on the inside between the container and the material and/or on the outside of the container.

The stereo-reticular array may be a mass of non-woven fibers which may be randomly bonded together. The mass of fibres may be a melded fibre structure as herein defined. The container may have a depth in excess of one half-meter and is preferably one meter deep.

The particulate material may be so chosen as to wear at an amount less than half the faradaic dissolution rate. The particulate materials may contain as impurities several percent of elements other than those previously mentioned.

By "faradaic dissolution rate" is meant the rate at which materials dissolve when all the current through the anode is used in dissolution of the material.

A stereo-reticular array is one in which there is a three-dimensional arrangement of plastics material surrounding inter-connected pores such that the pores form a continuous passage from one side of the array to the other side of the array. The plastics material may be formed from fibres which may be disposed in a felt-like mass and which may be non-woven. The fibres may be located in position by any suitable means such as needle punching and may be randomly bonded together.

A melded fibre structure is one in which two component fibres having a higher melting or softening point core and a lower melting or softening point sheath are matted together by any suitable means and then heated to a temperature at which the sheath becomes tacky to bond touching fibres together, but at which temperature the core is unmelted. After cooling, a bonded fibrous structure is formed. Such structures are available from the Fibres Division of Imperial Chemical Industries Limited, Harrogate, Yorkshire, England.

BRIEF DESCRIPTION OF THE DRAWINGS

By way of example, embodiments of the present invention will now be described with reference to the accompanying drawings of which.

DESCRIPTION OF THE PREFERRED EMBODIMENTS

Figure 1:
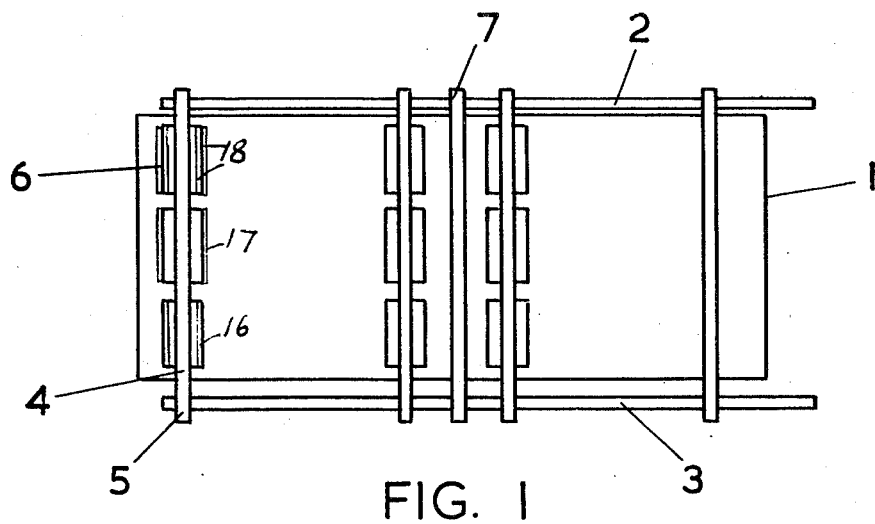
FIG. 1 is a plan view of one embodiment of the invention.

An electrowinning cell basically comprises a tank 1 having copper busbars 2 and 3 running in parallel along either side of the tank. The busbar 2 is connected to a positive source of electricity and the busbar 3 is connected to a negative source. Located in the tank 1 are a series of anodes and cathodes which alternate along the length of the tank. In the embodiment of FIG. 1, the anodes 4 are in the form of hanger bars 5 from which depend foraminate titanium baskets 6. The cathodes 7 are in the form of copper-cored titanium hanger bars to which are welded sheets of titanium to form the surface on which the electrowon material is deposited. The electrical supply to the anodes 4 is via the busbar 2 and the electrical supply to the cathodes 7 is via the busbar 3.

Figure 2:
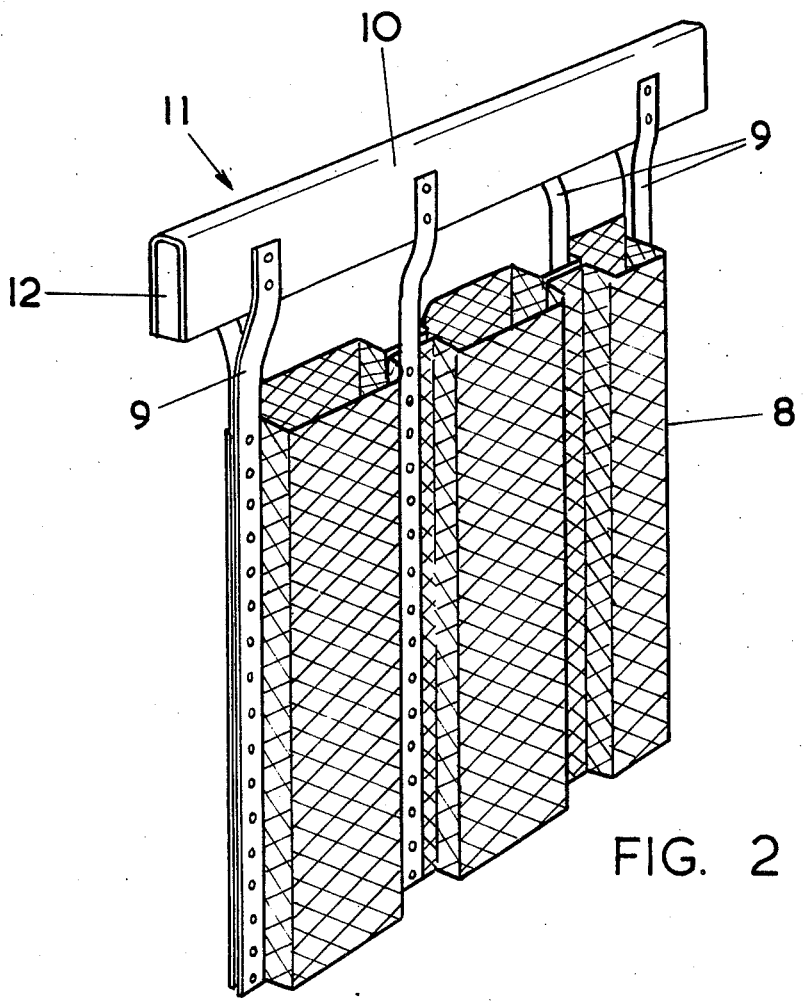
FIG. 2 is a perspective view of a foraminate basket and hanger bar assembly.

The form of the anode container is shown clearly in FIG. 2. A multicompartment titanium mesh basket 8 is spot-welded to titanium strips 9 which at their upper ends are spot-welded to a sheath 10 of a copper-cored hanger bar 11. The copper core 12 provides a high conductivity throughout the length of the hanger bar 11 protected by the exterior sheath 10. The exterior sheath also enables good electrical contact to be made between the copper and the basket. Into the compartments of basket 8 is placed the anode material of the invention in a particulate form such as small blocks or small slabs. During operation of the cell, the anode material is gradually consumed and is simply replaced by adding further particles of the anode material into the basket.

Figure 3:
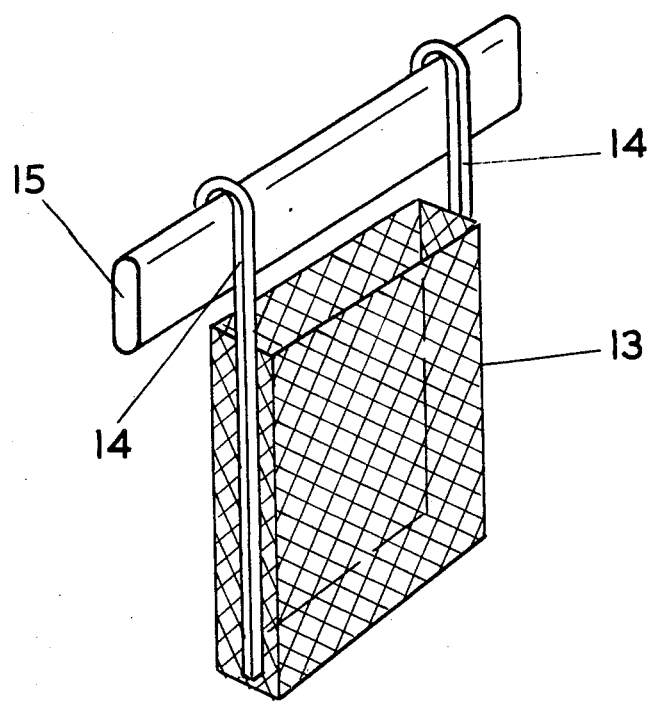
FIG. 3 is a perspective view of a foraminate basket having hooks and a hanger bar assembly.

In an alternative form, shown in FIG. 3, the anode comprises a foraminate titanium basket 13 which is suspended by hooks 14 from a copper hanger bar 15.

FIG. 1 also shows the use of melded fibre structures in conjunction with the more open meshed metal or plastics material baskets. 16 shows a basket having a melded fibre structure on the inside and 17 illustrates a basket having a melded fibre structure on the outside. 18 refers to baskets having melded fibre structures on the inside and on the outside.

The use of titanium anode baskets has been previously disclosed in connection with electroplating of various articles but has not been considered possible for electrowinning applications. Clearly it would be useless to use pure copper in the basket in an electrowinning cell since the anode would simple dissolve completely, leaving only the titanium basket which would rapidly passivate and the electrolysis would stop.

It has now been discovered that, using the anode material of the invention in a titanium anode basket, the current is able to pass through the oxide film on the titanium basket, or on the feeders, into the anode material and this conductivity is sufficient for an economic electrowinning cell. The use of particulate material means that the current density, and hence the wear rate, can be kept to an acceptably low level. Prior to the present invention, it had not been realised that non-metallic particulate material could be used in an anode basket with sufficient conductivity through the titanium oxide film for the arrangement to operate as an anode for electrowinning.

EXAMPLE I

Cobalt-silicon alloys containing 50% cobalt, 50% silicon, were tested in 6 inch deep titanium anode baskets at a cathode current density of 270 amps/$m^2$ in a cobalt sulphate liquor. The wear rate was determined to be 28mm/year.

EXAMPLE II

Copper-silicon alloys of the composition copper plus 20% silicon plus 8% iron plus 2% lead were tested as anodes in a liquor containing 6.5g/l copper, 26.4g/l nickel, 8g/l arsenic to 129g/l sulphuric acid at 200 amps/$m^2$ and at 60° C. The wear rate was determined to be 24mm/year under laboratory conditions.

Materials such as magnetite, ferro-silicons, lead dioxide, manganese dioxide, cobalt oxide $Co_2O_3$ or other suitable material such as titanium boride may also be used in particulate form in baskets, the material being replaced as it wears. It is believed that with relatively deep baskets, a sufficient weight of material may be placed in the basket to cause sufficiently high particle to basket pressure to be achieved so that a good current transfer from the basket to the particles is made.

Although titanium anode baskets have been described above, it is possible to use foraminate plastics baskets such as polypropylene mesh baskets. To provide an electrical current supply to the material within the basket, a copper-cored titanium rod conductor is used which makes contact with the particles in the basket and supplies current to the particles.

There are several advantages in using particulate materials. Firstly, a larger surface area can be provided within a given container by the use of particles compared with the use of slabs. It is possible, therefore, to reduce the current density at the surface of the particles if a given current has to be passed through the anode. This means that the wear rate of the material can be reduced. An additional advantage is that the passivation problems which are frequently associated with these materials are reduced by the use of the material in particulate form. For example, with copper-silicon alloys such as "Chilex", the copper is dissolved and is plated out on the cathode, but the silicon can form silicon dioxide which coats the material and interferes with the anode. By using the material in a particulate form, a greater surface area is provided which means that there is a lower rate of deposition of silicon dioxide onto the particle surfaces and the diffusion path for ions through the layer is sufficiently small to permit the anode to continue to function. The materials such as copper-silicon alloys, "Chilex" and cobalt-silicon alloys, "Luilu" frequently contain less than 20% of silicon and have an almost metallic appearance although they are very brittle and shatter if dropped. Another advantage is that the baskets can be easily refilled on a regular basis with particles of material so that the anode may be maintained indefinitely without discontinuous replacement. A further advantage of using particulate material is that brittle material which is not usable in slab form can be readily used in particulate form where its brittleness is not disadvantageous. In fact, the brittleness of the material may even aid the manufacture of the material in particulate form.

We claim:

1. A method of electrowinning a metal from an aqueous solution containing ions of the metal which includes the steps of inserting an anode and a cathode into the solution, connecting the anode positively with respect to the cathode, and passing an electrical current through the anode and cathode, characterised in that the anode is a foraminate container containing particulate material comprising electrically conducting, non-polarising compounds of a metal and a non-metallic element, there being provided means to supply the current to the particulate material.

2. A method as claimed in claim 1 in which the container is of a non-conducting material with a current lead-in in contact with the particulate material.

3. A method as claimed in claim 2 in which the foraminate container has a stereo-reticular array of plastics material on the inside between the container and the material.

4. A method as claimed in claim 3 in which the stereo-reticular array is a mass of non-woven fibres.

5. A method as claimed in claim 4 in which the mass of fibres is a molded fibre structure.

6. A method as claimed in claim 4 in which the fibres are randomly bonded one to the other where they are in contact with one another.

7. A method as in claim 3 wherein the foraminate container has a stereo-reticular array of plastics material on the outside of the container.

8. A method as claimed in claim 2 in which the lead-in is a copper-cored titanium bar.

9. A method as in claim 2 in which the container is constructed of a plastics material.

10. A method as claimed in claim 1 in which the non-metallic element is selected from the group consisting of oxygen, nitrogen, boron or carbon, and the metal is selected from the group consisting of titanium, vanadium, chromium, manganese, iron, cobalt, nickel, lead and copper.

11. A method as claimed in claim 10 in which the particulate material is selected from the group consisting of $PbO_2$, $MnO_2$, $Co_2O_3$ and magnetite.

12. A method as claimed in claim 1 in which the foraminate container is formed of titanium or a titanium alloy.

13. A method as claimed in claim 12 in which the foraminate titanium container has a stereo-reticular array of plastics material on the outside thereof.

14. A method as claimed in claim 1 in which the non-metallic element is silicon and the metal is selected from the group consisting of titanium, vanadium, chromium, manganese, iron, cobalt, nickel and copper.

15. A method as claimed in claim 1 in which the container had a depth in excess of one half-meter.

16. A method as in claim 15 wherein the container has a depth of one meter.

17. A method as claimed in claim 1 in which the particulate material anodically dissolves at a rate less than half the faradaic dissolution rate.

18. A method as claimed in claim 1 in which the materials used as the anode materials contain as impurities several percent of elements other than those previously mentioned.

* * * * *